United States Patent [19]

Shibano

[11] Patent Number: 5,424,955
[45] Date of Patent: Jun. 13, 1995

[54] METHOD OF CHECKING INTERFERENCE ON PROCESS PATTERN CAUSED BY TOOL POSITIONING

[75] Inventor: Ryozo Shibano, Tajimi, Japan
[73] Assignee: Murata Kikai Kabushiki Kaisha, Kyoto, Japan
[21] Appl. No.: 128,362
[22] Filed: Sep. 28, 1993
[30] Foreign Application Priority Data
   Oct. 2, 1992 [JP] Japan .................. 4-289505
[51] Int. Cl.$^6$ .................. G05B 19/4061; G06F 7/00
[52] U.S. Cl. .................. 364/474.2; 364/474.24
[58] Field of Search .................. 364/191–193, 364/474.2, 474.24, 474.26, 461, 474.19; 395/90

[56] References Cited

U.S. PATENT DOCUMENTS

| | | | |
|---|---|---|---|
| 4,635,185 | 1/1987 | Kishi et al. | 364/474.26 |
| 4,805,013 | 2/1989 | Dei et al. | |

FOREIGN PATENT DOCUMENTS

| | | | |
|---|---|---|---|
| 0234809 | 9/1987 | European Pat. Off. | |
| 60-57406 | 4/1985 | Japan | 364/474.26 |
| 62-121515 | 6/1987 | Japan | 364/474.26 |
| 1-297705 | 11/1989 | Japan | 364/474.24 |
| 3-219304 | 9/1991 | Japan | 364/474.24 |

Primary Examiner—Roy Envall
Assistant Examiner—Steven R. Garland
Attorney, Agent, or Firm—Spensley Horn Jubas & Lubitz

[57] ABSTRACT

The method checks whether a punching tool interferes with a closed line to be processed. Conventionally, line segments of the closed line is arranged in a CAD system in the order of drawing sequence. In this method, however, the line segments are arranged in the line extending order. Specifically, prepared is an interference line retrieval file in which data on line segments constituting the closed line are arranged in the order the line segments continue. Then, based on the data in the interference line retrieval file, it is checked whether or not a tool positioned on an arbitrary line segment interferes with other line segments which extend from the arbitrary line segment in a predetermined range in both forward and reverse directions the closed line extends. The line segments that extend within a predetermined range before and behind the subject line segment can be quickly identified with an easy and simple calculation since the line segments are arranged in the line extending order.

8 Claims, 7 Drawing Sheets

| | CONTINUOUS LINE FILE | | | | |
|---|---|---|---|---|---|
| OUTSIDE/ INSIDE | TYPE OF POINT | EXTERIOR ANGLE θ | X COORDINATE | Y COORDINATE | MISCELLANEOUS |
| OUTSIDE | ⌇ P P P P C ⌇ | ⌇ 90° 90° −45° 45° ⌇ | — — — — — — — | — — — — — — — | |
| INSIDE | P P P ⌇ | 60° 60° 60° | — — — — — — — — | — — — — — — — — | |
| OUTSIDE | | | — — — — — — — — | — — — — — — — — | |

(a1 brackets the first OUTSIDE section; b1 brackets the INSIDE section; b2 brackets the second OUTSIDE section)

INTERFERENCE RETRIEVAL FILE

| (ORDER) RECORD POINTER RP | STARTING ADDRESS | ENDING ADDRESS | OUTSIDE/ INSIDE LINE | OTHER INFORMATION | | | |
|---|---|---|---|---|---|---|---|
| | | | | TYPE OF LINE | STARTING POINT | ENDING POINT | MISCELLANEOUS |
| START-OF-DATA CODE | | | | | | | |
| 1 | | | OUTSIDE | STRAIGHT | $X_{1s}\ Y_{1s}$ | $X_{1e}\ Y_{1e}$ | |
| 2 | 0002 | 0004 | OUTSIDE | STRAIGHT | $X_{2s}\ Y_{2s}$ | $X_{2e}\ Y_{2e}$ | |
| 3 | 0003 | 0005 | OUTSIDE | STRAIGHT | $X_{3s}\ Y_{3s}$ | $X_{3e}\ Y_{3e}$ | |
| 4 | | | OUTSIDE | STRAIGHT | $X_{4s}\ Y_{4s}$ | $X_{4e}\ Y_{4e}$ | |
| ∫ | | | | | | | |
| 11 | | | | | | | |
| 12 | | | | | | | |
| END-OF-DATA CODE | | | | | | | |
| START-OF-DATA CODE | | | | | | | |
| 13 | ........ | ........ | | | | | |
| 14 | | | | | | | |
| ∫ | | | | | | | |
| 20 | ........ | ........ | | | | | |
| END-OF-DATA CODE | | | | | | | |
| START-OF-DATA CODE | | | | | | | |
| 21 | ........ | ........ | | | | | |
| 22 | ........ | ........ | | | | | |

14, a1, b1, b2

METHOD OF CHECKING INTERFERENCE ON PROCESS PATTERN CAUSED BY TOOL POSITIONING

BACKGROUND OF THE INVENTION

1. Technical Field

The present invention relates to a method applicable to CAD/CAM systems such as punch presses for checking whether or not tool positioning interferes with a pattern to be processed.

2. Background Art

In order to automatically create an NC program for a punch press, an operator is required to determine, as part of the input operation, the position of a tool relative to an image to be processed. In such a case, it is necessary to check whether any interference is caused by the positioning of the tool.

FIG. 8(A) of the accompanying drawings shows that a punch tool T is positioned on a line segment Ea of a closed outline pattern E displayed on a CRT monitor by the operator's input operation. When the tool T is positioned in the bay of the closed outline E as shown in FIG. 8(A), it is necessary to check whether or not the tool T interferes with adjacent line segments Eb and Ec.

There is a method of checking such interference: an operator touches the line segment Ea on which the tool T is positioned (subject line segment), and the adjacent line segments Eb and Ec using a pointing device or the like, as indicated by "x" in FIG. 8(A), to cause the interference check module of an automatic programming device to conduct a checking operation.

However, this method requires the operator to manually touch each and every desired line segment, so that a substantial amount of time is needed in case of very complicated pattern, hence causing programming to become laborious.

FIG. 8(B) shows another method, which requires the operator only to specify the subject line segment Ea. As the subject line segment Ea is specified, an automatic programming device scans all the way along the outline of the closed pattern E to identify the adjacent line segments Eb and Ec for the interference checking.

In CAD patterns, however, the record of each line segment is stored in the order of drawing sequence, and actual patterns are usually by far more complicated than the one shown in FIG. 8. More often than not, CAD patterns includes a single closed outline E (configuration line) and many other closed patterns inside the outline E (for the punching), thereby totaling thousands of line segment records, including those for drawing a tool picture. Therefore, a number of calculation steps are needed to identify (or reach) the adjacent line segments Eb and Ec. If an automatic programming device with an ordinary processing rate is used for this purpose, it takes tens of seconds to conduct the interference checking for a single line segment. This makes it impossible to put the above-described automatic interference-checking method into practical use.

SUMMARY OF THE INVENTION

An object of the present invention is to provide a method of checking whether a tool positioned on a certain line segment of a pattern interferes with other line segments, by which method the operator is not required to designate a line segment to be checked for interference. The operator only specifies the line segment on which a tool will be positioned (subject line segment) so that the interference checking can be rapidly and automatically conducted.

In referring to FIG. 1 of the accompanying drawings, a general concept of the present invention will be described. The interference checking method of this invention first creates, as preprocessing, an interference line retrieval file which contains line segment records as arranged in the line segment continuing order (or line extending order) (S5), and conducts the interference checking by using the retrieval file (S7).

The interference line retrieval file is created by rearranging the original process pattern data. Specifically, in this file, all line segment records are grouped separately for each closed line and arranged in the line extending order. Each line segment record is given a record pointer which indicates the line segment's position in the closed line.

Further, a continuous line file may be prepared before the interference checking. In the continuous line file, all line segment records of a closed line are arranged in the line extending order. In addition, a new CAD data file may be created on the basis of the continuous line file. In this new CAD data file, all the line segments are independent and each line segment has a one-to-one relationship with a corresponding record in the interference line retrieval file. The record pointer is written into the attribute data (e.g. name of a picture layer) for CAD line segments in the new CAD data file.

Interference checking is conducted by determining whether or not a tool positioned on an arbitrary line segment (subject line segment) of a pattern to be processed interferes with other line segments extending before and behind the subject line segment within a predetermined range. The attribute data for the CAD line segments in the new CAD data file and the data of the interference line retrieval file are used for this purpose.

By the method of this invention, all the line segments that extend within a predetermined range before and behind the subject line segment can be quickly identified with an easy and simple calculation because all the line segment records are arranged in the line extending order and both the attribute data of the CAD line segments and the interference line retrieval file data are used. Therefore, the interference checking can be quickly conducted.

Although it takes time to create the interference line retrieval file, once completed, the retrieval file can be repeatedly used to conduct the interference checking for all the line segments of a pattern to be processed. The total processing time, therefore, can be reduced even if the file creation time is included. In addition, the operator may leave while the interference line retrieval file is being automatically created. This lightens the burden on the operator.

BRIEF DESCRIPTION OF THE DRAWINGS

FIG. 4 is a diagram of a data structure in a continuous line file;

FIG. 5 is a diagram of a data structure in an interference line retrieval file;

DETAILED DESCRIPTION OF THE PREFERRED EMBODIMENTS

A preferred embodiment of the present invention will be described referring to FIGS. 1 to 7B.

Figure 2:
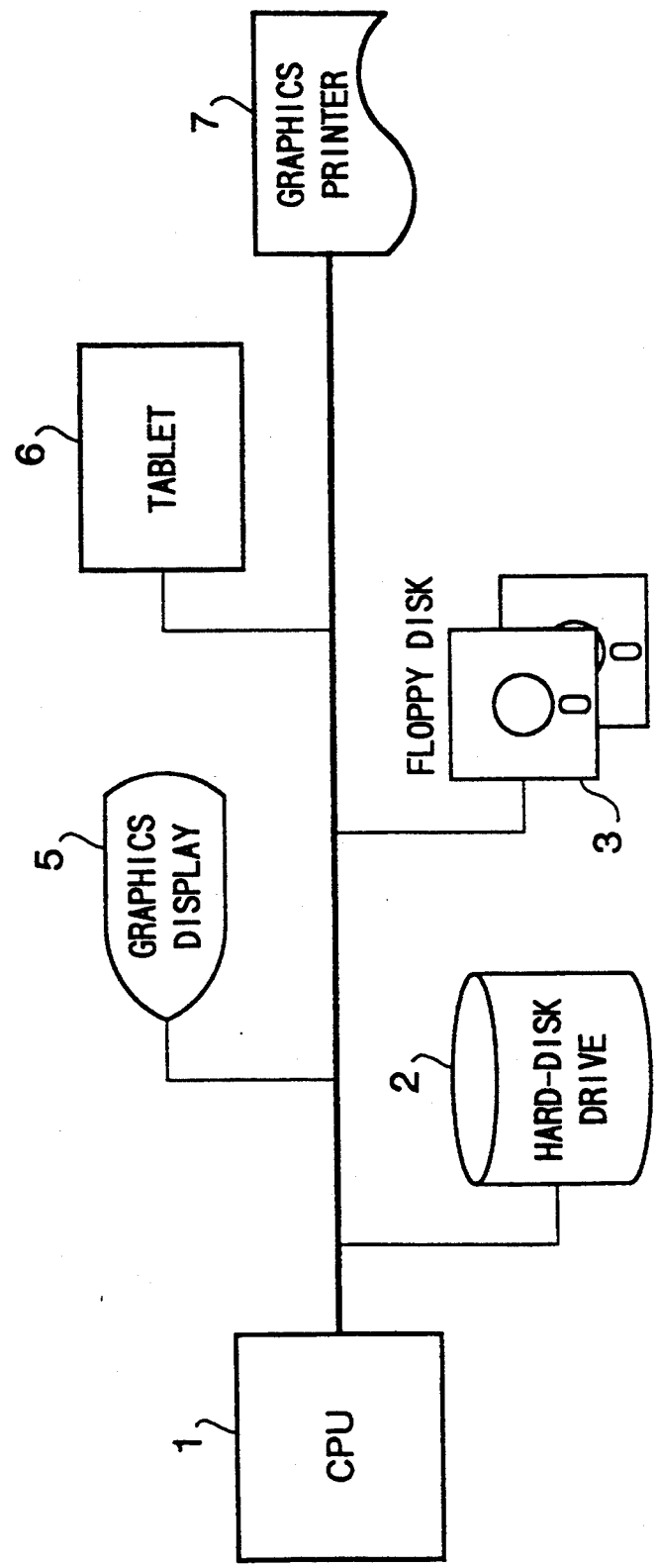
FIG. 2 is a block diagram of a hardware system to perform automatic programming for the process of FIG. 1.

FIG. 2 shows a hardware system of an automatic programming device to which the method of this invention is applicable. In this embodiment, a CPU 1 is connected to a hard-disk drive 2, a floppy-disk drive 3, a graphics monitor 5, a mouse 6 and a graphics printer 7.

Figure 3:
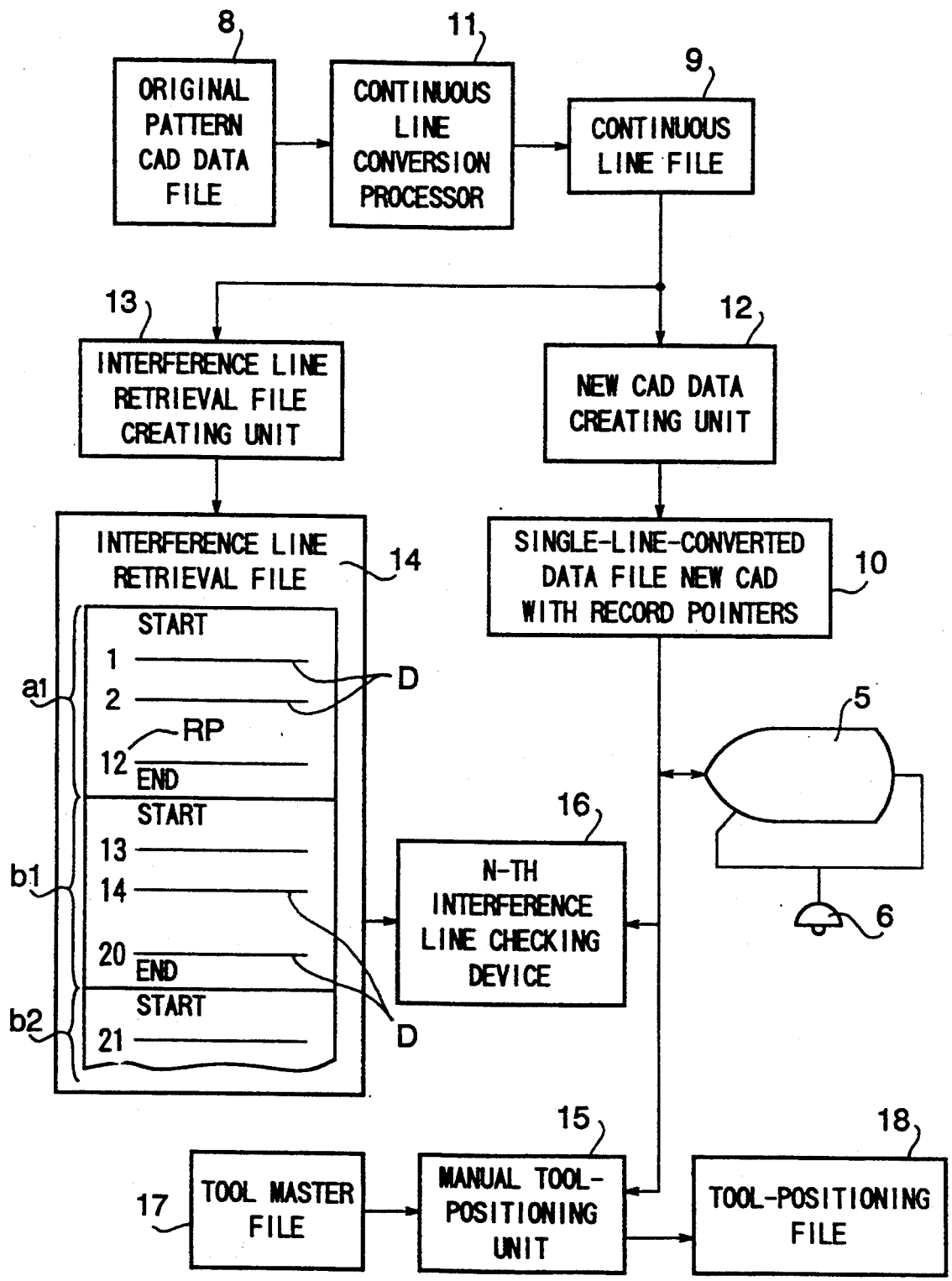
FIG. 3 is a conceptual view of a system to implement the tool-positioning method of FIG. 1.

FIG. 3 shows a conceptual view of a unit which implements, using the system of FIG. 2, a tool-positioning method that includes the method of this invention.

A original pattern CAD data file 8 contains process pattern data which is to be processed. The original pattern CAD data file 8 is preprocessed into a continuous line file 9 by a continuous line conversion processor 11 (preprecessing). Based upon the continuous line file 9, an interference line retrieval file 14 and a new CAD data file 10 are created by an interference line retrieval file creating unit 13 and a new CAD data creating unit 12, respectively.

The interference line retrieval file 14 contains line segment data D which is grouped separately for the closed patterns a1, b1 and b2. The line segment data D are arranged in the line segment continuing order (line extending order) in the file 14, and a record pointer RP indicative of the order of the line segments is assigned to each line segment data D.

In the new CAD data file 10, all line segment records are independent and each line segment has a one-to-one relationship. with a corresponding record in the interference line retrieval file 14. The record pointer RP of the interference line retrieval file 14 is written to the attribute data (e.g. name of a picture layer) for the CAD line segments in the new CAD data file.

The manual tool-positioning unit 15 is provided for allowing the operator to manually position a tool on a line segment of a process pattern. This unit 14 is operated by using the monitor 5 and the mouse 6 via an interactive processing device (not shown). Data in the new CAD data file 10 is used as data of a process pattern which a tool or tools are positioned. Data on the tool positioning is output to the tool positioning file 18. A tool master file 17, which contains data on various punch tools and screen display data for these punch tools, provides tool information which is processed by the manual tool positioning device 15. During the tool positioning process by the manual tool positioning device 15, interference checking is conducted by an up-to n-th line segment interference checking device 16, which uses the data in the interference line retrieval file 14.

The up-to n-th line segment interference checking device 16 determines whether or not a tool positioned on a line segment of a closed line (subject line segment) interferes with other line segments that occur within a predetermined range (up to the n-th line segment from the subject line segment before and behind the subject line segment) by using a record pointer carried by the line segment attribute data for new CAD data and the data of the interference line retrieval file 14. The number n can be freely set by the operator according to the complexity of the closed line and other factors.

Figure 1:
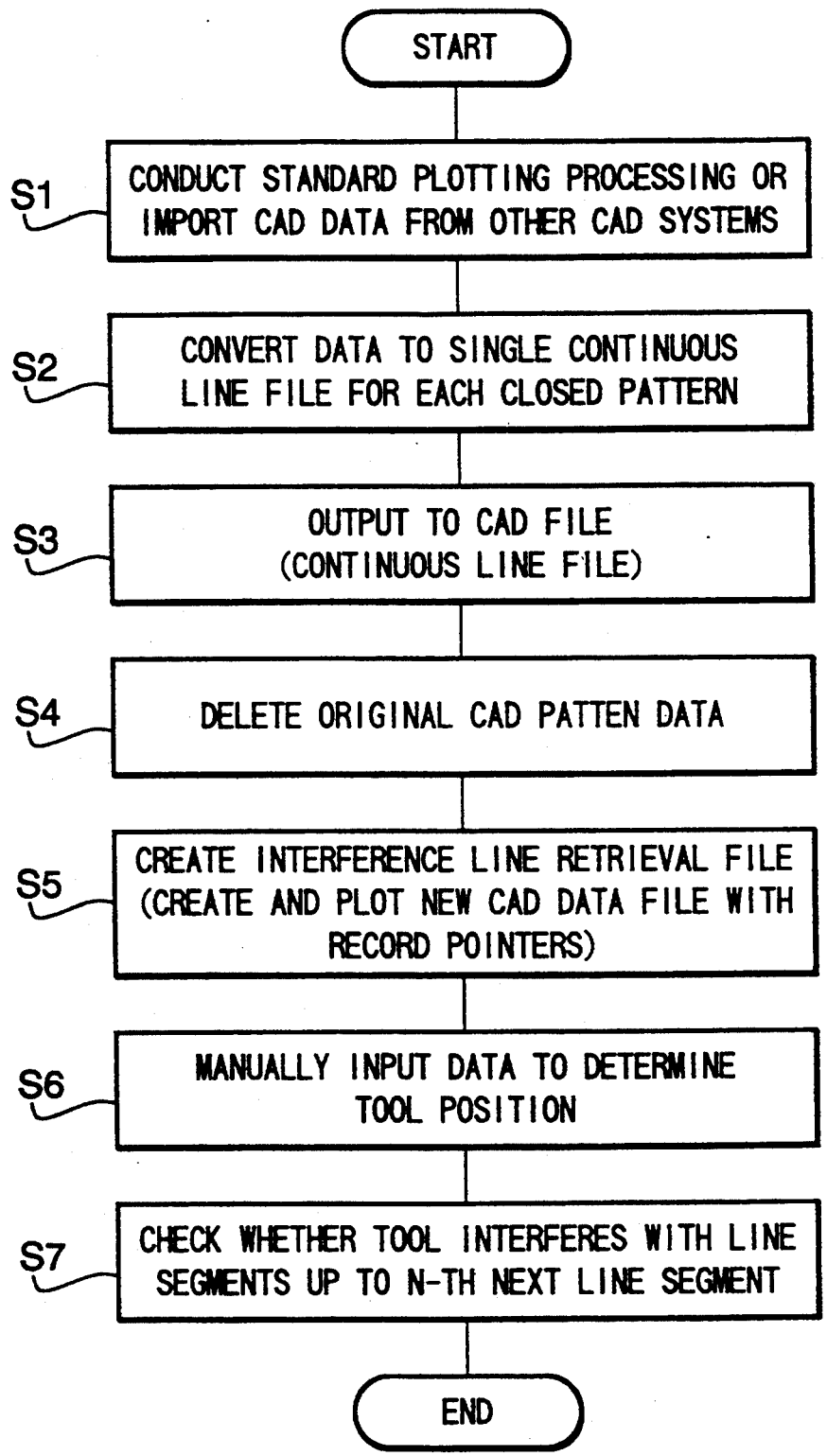
FIG. 1 is a flowchart illustrating a tool-positioning method, including a process for checking tool-positioning interference according to an embodiment of the present invention.

FIG. 1 depicts a flowchart of a tool-positioning method which includes the method of this invention for checking tool-positioning interference. As shown in step S1, the operator can draw patterns with the CAD function of the system of FIG. 2, or import CAD data from other CAD systems and create the original pattern CAD data file 8 of FIG. 2. This CAD data is converted to single continuous line data (S2) and is then output to the continuous line file 9 (S3). Since some CAD systems have this continuous line conversion function, the operator may transfer continuous-line-converted CAD data to the system of FIG. 3.

Once the conversion to a continuous line format is completed, the original CAD pattern data displayed on the CRT is deleted (S4). The interference line retrieval file 14 and the new CAD data file 10 with the record pointer are automatically created on the basis of the continuous line file 9, and a new CAD pattern is plotted according to the new CAD data file (SS).

Then, the operator inputs a tool position (S6), and conducts the interference checking up to the n-th line segment from the subject line segment before and behind the subject line segment (S7). When no interference is verified to exist, the tool position can be fixed. Though omitted in FIG. 1, the tool positioning and interference checking are conducted for every tool to be mounted. In short, steps 6 and 7 in FIG. 1 are repeated until all the tool positioning is completed. It is acceptable to conduct the interference checking for all the tools one by one after tentative positioning of all the tools is completed.

Figure 6A:
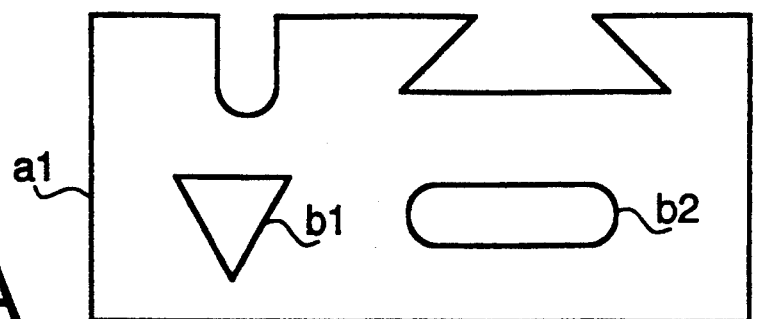
FIGS. 6A-6D are a set of views showing process patterns to which the method for checking tool-positioning interference of the present invention is applicable.
Figure 6B:
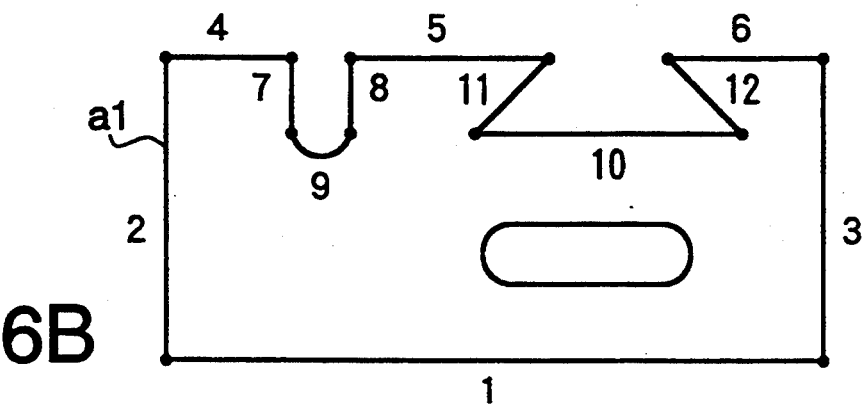

Next, a tool-positioning method and a tool-positioning interference checking method will be described below using concrete patterns. FIG. 6(A) shows an example of an original CAD pattern created for punching. In other words, this is a typical CAD pattern. This particular pattern includes a single closed outline pattern (outside line) a1 and two closed punching patterns (inside lines) b1 and b2. These patterns a1, b1 and b2 consist of straight and arc line segments. The line segment records are stored in the original pattern CAD data file 8 (FIG. 3) in the order of drawing sequence. The line segment records of the closed outline pattern a1 are, for instance, stored in numerical order from 1 to 12 as shown in FIG. 6(B). In many instances, line segment records of several closed patterns are stored in a mixed state because those records are identified in the order of drawing sequence.

At step S2 in FIG. 1, these disordered records of line segments are converted to continuous line data items for the closed patterns a1, b1 and b2, respectively. In the closed outline pattern a1, for example, the line segment records are converted to a continuous chain form as arranged in the line extending order, as indicated as by the numbers 1 to 12 in FIG. 6(C). In this particular example, the line segments are arranged counterclockwise.

Figure 6C:
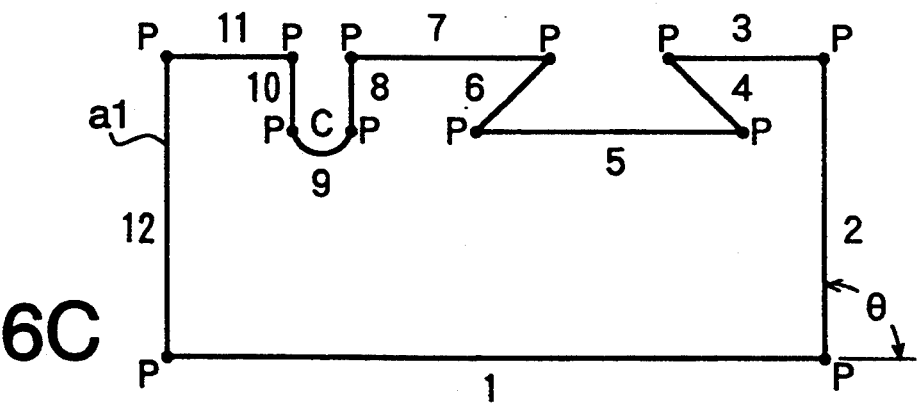

FIG. 4 shows an example of the data structure (data array) in the continuous line file 9. In this data array, a group of line segment records are used to represent each of the patterns a1, b1 and b2, and each of the line segment records represents a straight or arc line segment. These line segment records for a single closed line are arranged in the line extending order with the numbers, for example, as shown in FIG. 6(C) (line segment continuing order). The line segment record is accompanied with the type of point (straight line is indicated by P and arc line is indicated by C), exterior angle $\theta$ (see FIG. 6(C)), the x and y coordinates of a point, and other data (e.g. radius of the arc). In the data for a single closed line, Information to distinguish the outline (outside line), from the punching patterns (inside lines) is contained.

Figure 6D:
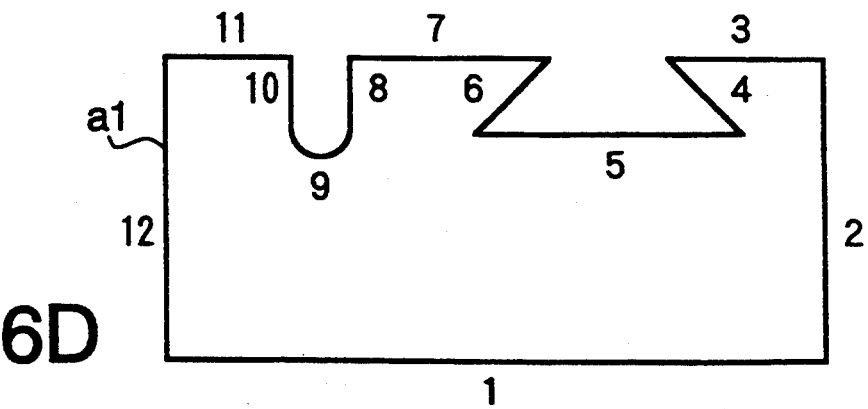

FIG. 5 shows an example of the data structure in the interference line retrieval file 14. In the interference line retrieval file 14, the enclosed line is broken down into minimum straight and arc units, as shown in FIG. 6(D) and these minimum units are stored in a memory area of the file 14. In the file 14, each minimum unit is accompanied with the record pointer RP which indicates the order in the closed line, the start and end addresses, indication of outside line or inside line, indication of straight line or arc line, x and y coordinates of the starting and ending points and the angle of arc (exterior or interior of the arc is indicated by a plus or minus sign).

The line segment records constituting the closed lines a1, b1 and b2 are arranged in the line extending order (e.g., the line segments of the closed line a1 are given the numbers 1 to 12 as shown in FIG. 6(D), and those of the closed line b1 are given the numbers 13-20 (FIG. 5)). In addition, the start-of-data and end-of-data codes are written to the data group of each of the closed lines a1, b1 and b2, as shown in FIG. 5.

The record pointer RP corresponds to the line extending order of the continuous line segments that constitute the closed patterns a1, b1 and b2, respectively. The starting address corresponds to the line number in the data array where the preceding line segment record is written, and the ending address corresponds to the line number where the next line segment record is written. These addresses may be replaced by physical addresses.

Figure 7A:
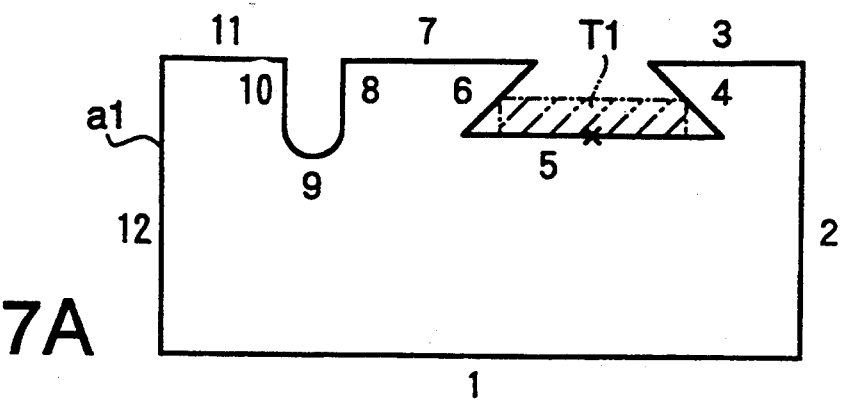
FIGS. 7A-7B are a set of diagrams of tool positioning.
Figure 7B:
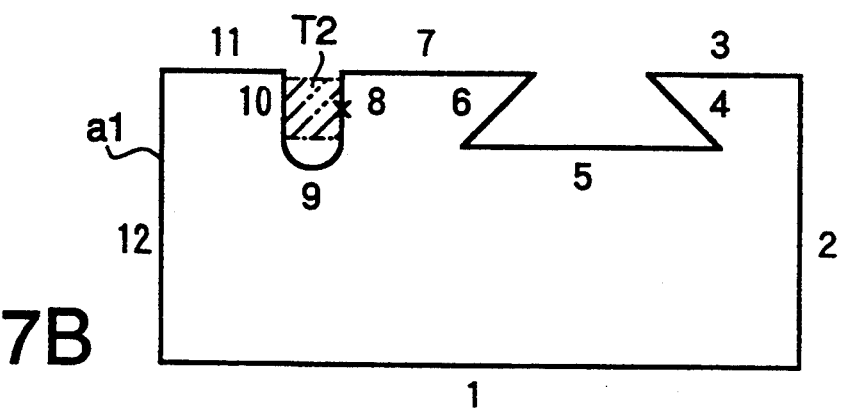
Figure 8A:
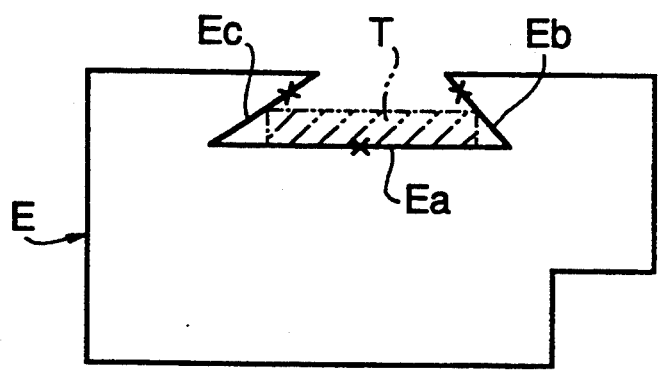
FIGS. 8A-8B are a set of diagrams illustrating conventional methods for checking the tool-positioning interference.
Figure 8B:
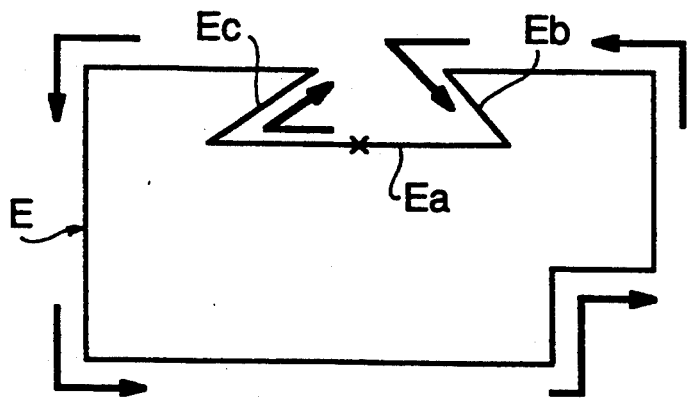

FIG. 7A and 7B show an example of tool positioning specified by the operator using the closed pattern a1 shown in FIG. 6(D). Specifically, FIG. 7(A) shows a case where the punch tool T1 is positioned on the line segment (5) of the closed pattern a1. This operation is conducted by plotting the closed pattern a1 on the screen of the monitor 5 based on the new CAD data, designating the subject line segment (5) by means of the mouse 6 according to the guidance displayed on the monitor 5 and controlled by the manual tool positioning unit 15, and determining the type and position of the tool on the line segment (5).

If the operator gives a command to conduct the interference checking in such a state, the up-to n-th next line segment interference checking device 16 of FIG. 3 triggers the checking process and scans all the line segments up to the n-th next ones from the subject line segment (5) in both the forward and reverse directions. Assuming n=3, the line segments (4), (3) and (2) in the reverse direction and (6), (7) and (8) in the forward direction shown in FIG. 7(A) are checked for interference.

In the process of the interference checking device 16, the record pointer is traced by referring to a line segment layer in the new CAD data file 10, and line segments to be interference-checked are scanned in the data group (from the start-of-data code to the end-of-data code) for the closed pattern of the interference line retrieval file 14 which includes the subject line segment. In this scanning process, only one closed pattern is required to be scanned Also, the record pointer RP identifies the target record in the interference line retrieval file 14, and enables the operator to read the records of the adjacent (preceding and following) line segments (including data which is used for interference line calculation), thus making the retrieval process easier and faster.

The interference checking is conducted by comparing the scanned line segment records with the data on the tool T1. In FIG. 7(A), checking the first next line segments (the adjacent line segments) (4) and (6) (n=1) is enough. In other cases, however, it may be necessary to check more line segments depending upon the shape of the closed pattern in question. The automatic programming device cannot make such a judgment. In this embodiment, therefore, all the line segments which occur within a prescribed range (up to the n-th line segment both in the forward and reverse directions) are checked for interference and, if no interference is detected, the operator manually fix the position of the tool T1.

FIG. 7(B) illustrates an example in which another tool T2 is positioned on the line segment (8). In this case, it is necessary to check the line segment (10) which is the second next line segment in the line extending order. However, if n is set to 3 (n=3) beforehand, the line segments (7), (6) and (5) in the reverse direction and (9), (10) and (11) in the forward direction are automatically checked for interference.

By the method of the present invention, the interference checking can be quickly conducted and NC programs can be created in an error-free manner with an easy input operation since the line segments are numbered in the line extending order and are arranged in the file 14 in the same order.

Although it takes time to create the interference line retrieval file 14 this needs to be done only once In addition *since the continuous line file 9 having its data records arranged in the line extending order is used, the time required for the creation of the interference line retrieval file 14 is practically negligible.

The structure of the interference line retrieval file 14 can be modified to any other data structure as long as it is applicable to determining whether or not interference exists. For example, it is possible to create a structure which includes process accuracy such as nibbling pitch.

What is claimed is:

1. A method for identifying interference between a tool and a pattern, the pattern having at least one substantially closed line comprising a plurality of line segments substantially arranged in a series, the method comprising:

creating an interference line retrieval file comprising a plurality of line segment records, each of the plurality of records containing data relating to a corresponding one of the plurality of line segments, the plurality of records being arranged in a series corresponding to the series of line segments, whereby adjacent records in the series of records correspond to adjacent line segments in the pattern, and determining whether a tool positioned on a line segment in the pattern interferes with other line segments in the pattern by comparing data in the interference line retrieval file with data corresponding to the tool for each of a plurality of records within a predetermined range, the predetermined range including records in the series of records which are adjacent to the record corresponding to the line segment on which the tool is positioned.

2. The method of claim 1, comprising:

providing at least one of the records with a first indicator for indicating whether the line segment corresponding to the record comprises at least one of a substantially straight line segment and a substantially curved line segment.

3. The method of claim 2, wherein the pattern includes at least a first closed line comprising a plurality of line segments substantially arranged in a series and at least a second closed line comprising a plurality of line segments substantially arranged in a series, the second closed line being located substantially within the first closed line, and comprising:

providing at least one of the records with a second indicator for indicating whether the line segment corresponding to the record comprises at least one of the line segments of the first closed line and the second closed line.

4. The method of claim 3, further comprising selecting the predetermined range.

5. A method for identifying interference between a tool and a pattern, the pattern having at least one substantially closed line comprising a plurality of line segments substantially arranged in a series, the method comprising:

creating a continuous line file comprising a plurality of line segment records, each of the plurality of records containing data relating to a corresponding one of the plurality of line segments, the plurality of records being arranged in a series corresponding to the series of line segments, whereby adjacent records in the series of records correspond to adjacent line segments in the pattern, creating an interference line retrieval file comprising a plurality of records, each of the plurality of records containing data relating to a corresponding one of the plurality of line segments, the data including a pointer indicating the line segment's position in the series of line segments, creating a new CAD data file in which the pointers stored in the interference line retrieval file are written to attribute data of each line segment based upon the continuous line file so as to convert data on the pattern into new CAD data, and determining whether a tool positioned on a line segment of the new CAD data interferes with other line segments in the new CAD data by comparing data in the interference line retrieval file with data corresponding to the tool for each of a plurality of records within a predetermined range, the predetermined range including records in the series of records which are adjacent to the record corresponding to the line segment on which the tool is positioned.

6. The method of claim 5, comprising:

providing at least one of the records of the interference line retrieval file with a first indicator for indicating whether the line segment corresponding to the record comprises at least one of a substantially straight line segment and a substantially curved line segment.

7. The method of claim 6, wherein the pattern includes at least a first closed line comprising a plurality of line segments substantially arranged in a series and at least a second closed line comprising a plurality of line segments substantially arranged in a series, the second closed line being located substantially within the first closed line, and comprising:

providing at least one of the records of the interference line retrieval file with a second indicator for indicating whether the line segment corresponding to the record comprises at least one of the line segments of the first closed line and the second closed line.

8. The method of claim 7, further comprising selecting the predetermined range.

* * * * *